United States Patent [19]
Yoshida

[11] Patent Number: 4,616,519
[45] Date of Patent: Oct. 14, 1986

[54] MAGNETICALLY OPERATED POWER TRANSMISSION APPARATUS

[76] Inventor: Tokuichiro Yoshida, 13-14 Iseche Kamasakiku, Kawasaki, Japan

[21] Appl. No.: 593,346

[22] Filed: Mar. 26, 1984

[30] Foreign Application Priority Data

Mar. 28, 1983 [JP] Japan .................. 58-52237

[51] Int. Cl.$^4$ .................. F16H 15/16; F16H 13/12; F16H 55/34
[52] U.S. Cl. .................. 74/191; 74/DIG. 4; 74/210; 74/215; 74/193
[58] Field of Search .................. 74/191, 192, 193, 190, 74/210, 214, 215, DIG. 4

[56] References Cited

U.S. PATENT DOCUMENTS

| | | | |
|---|---|---|---|
| 1,036,134 | 8/1912 | McLaughlin | 74/191 |
| 1,178,834 | 4/1916 | Beland | 74/191 |
| 1,486,389 | 3/1924 | Ockfen | 74/191 |
| 1,559,975 | 11/1925 | Murray | 74/215 |
| 1,986,436 | 1/1935 | Heinze | 74/210 |
| 2,167,641 | 8/1939 | Dewan | 74/210 |
| 2,275,404 | 3/1942 | Banning | 74/193 |
| 3,048,046 | 8/1962 | Cosby | 74/191 |
| 4,067,438 | 1/1978 | Spurr et al. | 74/210 |
| 4,459,868 | 7/1984 | Sargent | 74/208 |

FOREIGN PATENT DOCUMENTS 968884  7/1949  Fed. Rep. of Germany ........ 74/210

*Primary Examiner*—Lawrence J. Staab
*Assistant Examiner*—Michael D. Bednarek
*Attorney, Agent, or Firm*—Nolte, Nolte and Hunter

[57] ABSTRACT

An improved stepless power transmission apparatus of the type utilizing magnetic force for making an operative connection between a driving pulley and a driven pulley. The apparatus essentially comprises a primary shaft operatively connected for rotation to a prime mover and having a spirally extending groove formed thereon, a disc-shaped driving pulley displaceably fitted onto the primary shaft in operational engagement with the spirally extending groove, an expansive spring for causing the driving pulley to be normally urged in a direction away from the proper input end of the primary shaft, a truncated cone-shaped driven pulley whose outer conical surface is adapted to come in rolling contact with the peripheral surface of the driving pulley and a secondary shaft made integral with the driven pulley and operatively connected to a power consuming machine or apparatus via a universal joint. The driving pulley is made of a plurality of radially extending permanent magnets with spacers of non-magnetic material interposed in spaces between adjacent ones of the magnets, while the driven pulley is made of non-magnetic material and has a number of rod-shaped magnetizable pieces embedded in the outer conical surface thereof whereby reliable operative connection is made between the pulleys with the aid of magnetic force. The rod-shaped magnetizable pieces may be replaced with axially extending plate-shaped magnetizable pieces.

6 Claims, 6 Drawing Figures

MAGNETICALLY OPERATED POWER TRANSMISSION APPARATUS

BACKGROUND OF THE INVENTION

1. Field of the Invention

The present invention relates to a magnetically operated or assisted power transmission apparatus and more particularly to a power transmission apparatus of the type utilizing magnetic force for making a reliable operative connection between a driving pulley and a driven pulley to steplessly transmit rotational power outputted from a prime mover to a power consuming machine or apparatus.

2. Description of the Prior Art

A hitherto known stepless power transmission apparatus of the type including a driving pulley and a driven pulley in generally constructed such that the former is designed in the form of a disc and the latter is designed in the form of a truncated cone so that rotational force outputted from the prime mover is transmitted to the power consuming side by way of frictional contact between both the driving and driven pulleys. Because of the fact that power transmission is achieved merely with the aid of frictional force in the contact area between both the pulleys, the conventional stepless power transmission apparatus has a drawback in that some slippage takes place in the contact area, resulting in reduced power transmission efficiency.

SUMMARY OF THE INVENTION

Thus, the present invention has been made with the foregoing drawback in mind.

It is an object of the present invention to provide an improved stepless power transmission apparatus of the above-mentioned type which assures that power transmission is achieved without occurence of slippage in the contact area between a disc-shaped driving pulley and a truncated cone-shaped driven pulley.

It is another object of the present invention to provide an improved stepless power transmission apparatus of the above-mentioned type which has high power transmission efficiency.

It is another object of the present invention to provide an improved stepless power transmission apparatus of the above-mentioned type which is simple in structure and therefore can be manufactured at an inexpensive cost.

To accomplish the above objects there is proposed in accordance with the present invention a magnetically operated or assisted power transmission apparatus for steplessly transmitting rotational force outputted from a prime mover to a power consuming machine or apparatus, comprising a primary shaft operatively connected to the prime mover by way of coupling means and having a spirally extending groove formed over the outer surface thereof, a driving pulley displaceably fitted onto the primary shaft and including engagement means adapted to come in engagement with said sprially extending groove, the driving pulley being formed of a plurality of radially extending permanent magnets with spacers of non-magnetic material interposed between adjacent ones of the magnets, an expansive spring means disposed on the primary shaft so as to allow the driving pulley to be normally urged in the direction away from the power input end of the primary shaft, a truncated cone-shaped driven pulley whose outer conical surface is adapted to come in rolling contact with the outer surface of the driving pulley, the driven pulley being made of non-magnetic material and having a number of rod-shaped magnetizable pieces embedded in the outer conical surface thereof so as to magnetically couple with some of the permanent magnets of the driving pulley and thereby magnetically connect the driving and driven pulleys, and a secondary shaft integral with the driven pulley and extending at a certain inclination angle relative to the primary shaft so as to allow it to be operatively connected to a power consuming machine or apparatus at its outermost end by way of a universal joint.

As a modification of the above-described power transmission apparatus, a pair of combinations of the driving pulley and truncated cone-shaped driven pulley are arranged in such a manner that the truncated end parts of the driven pulleys are located in a face-to-face relation so that more reliable power transmission is achieved by way of magnetic connections in each of two contact areas.

Alternatively, an arrangement may be made such that the driving pulley is accommodated in the truncated cone-shaped inner space of the driven pulley so that the outer surface of the driving pulley comes in rolling contact with the the inner conical surface of the driven pulley.

Further, the truncated cone-shaped driven pulley may be formed of a plurality of axially extending magnetizable pieces with spacers of non-magnetic material interposed between adjacent ones of the pieces.

Other objects, features and advantages of the invention will become more clearly apparent from reading the following description in conjunction with the accompanying drawings.

BRIEF DESCRIPTION OF THE DRAWINGS

The accompanying drawings will be briefly described below.

It should be noted that same or similar components or parts throughout the drawings are identified by the same reference numerals.

DETAILED DESCRIPTION OF THE PREFERRED EMBODIMENTS

Now, the present invention will be described in greater detail hereunder with reference to the accompanying drawings which schematically illustrate a few preferred embodiments thereof.

Figure 1:
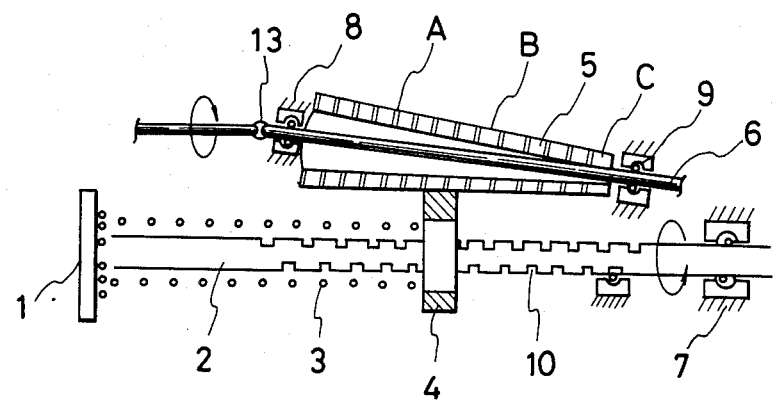
FIG. 1 is a schematic sectional view of a power transmission apparatus in accordance with the first embodiment of the invention.
Figure 2:
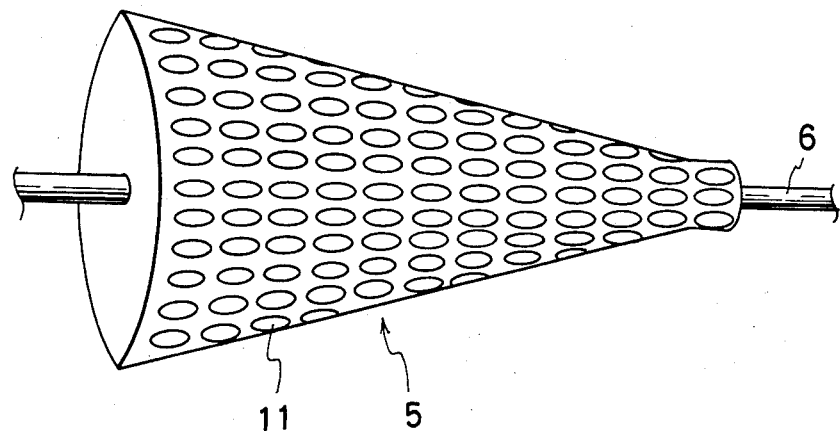
FIG. 2 is a perspective view of a truncated cone-shaped driven pulley with a number of rod-shaped magnetizable pieces embedded in the whole outer conical surface thereof.
Figure 3:
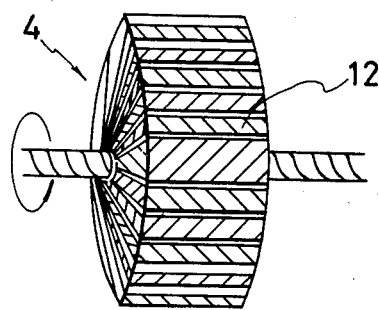
FIG. 3 is a perspective view of a driving pulley displaceably mounted on the primary shaft, particularly illustrating how the driving pulley is constructed from a plurality of radially extending permanent magnets.

Referring first to FIGS. 1 to 3, reference numeral 1 designates an output end of an engine (not shown), reference numeral 2 designates a primary shaft operatively connected to the output end 1, reference numeral 3 designates an expansive coil spring disposed on the primary shaft 2, reference numeral 4 designates a driving pulley, reference numeral 5 designates a driven pulley having a truncated cone-shaped configuration and reference numeral 6 designates a secondary shaft. Reference numeral 7 designates a ball bearing for rotatably supporting the primary shaft 2, whereas reference numerals 8 and 9 designate ball bearings for rotatably supporting the secondary shaft 6.

As is apparent from FIG. 1, a spirally extending groove 10 is formed in the outer surface of the primary shaft 2 so that the driving pulley 4, by means of a suitable groove-engaging configuration of its hub portion, is displaceable along the spirally extending groove 10 in the axial direction while the shaft 2 is rotating. Further, the driving pulley 4 is normally urged in the rightward direction as seen in the drawing under the influence of resilient force of the expansive coil spring 3. The driven pulley 5 having the truncated cone-shaped configuration is disposed in such a manner that the larger diameter end part, i.e., its low speed side A, is located at the lefthand end and the smaller diameter end part, i.e., its high speed side C, is located at the righthand end as seen in the drawing. It should be noted that the lower generating line of the truncated cone-shaped driven pulley 5 extends in parallel with the center line of rotation of the primary shaft 2 so as to assure that the driving pulley 4 is normally brought in rolling contact with the driven pulley 5. When the driving pulley 4 assumes a position in proximity to the larger diameter end part of the driven pulley 5, the latter is caused to rotate at a lower rotational speed. On the other hand, when the driving pulley 4 assumes a position in proximity to the smaller diameter end part of the driven pulley 5, the latter is caused to rotate at a higher rotational speed.

As illustrated in FIG. 2, the driven pulley 5 is made of non-magnetic material and a number of rod-shaped magnetizable pieces 11 are embedded in the whole outer conical surface of the driven pulley 5. Further, as illustrated in FIG. 3, the driving pulley has a disc-shape and is constructed from a plurality of radially extending permanent magnets 12 with spacers of non-magnetic material interposed between adjacent magnets 12. Owing to the arrangement of the rod-shaped magnetizable pieces 11 and the radially extending permanent magnets 12, magnetic connection is assured between the driving and driven pulleys 4 and 5 in addition to frictional connection therebetween whereby rotational force generated by the engine is reliably transmitted to the power consuming machine or apparatus.

Next, operation of the magnetically operated or assisted transmission apparatus will be described below.

First, it is assumed that the driving pulley 4 is initially located at the middle position on the primary shaft 2 when the engine starts its rotation. If the driving pulley 4 fails to rotate the driven pulley 5 because of the dead load of the power consuming machine or apparatus at the time of engine starting, the driving pulley 4 is caused to move to the left as seen in the drawing along the track of the spirally extending groove 10 against resilient force of the coil spring 3 without occurence of rotation as the primary shaft 2 is rotated by engine. It continues to move to the left, that is, toward the low speed side on the driven pulley 5, until the driving pulley 4 is brought in torque balance with the driven pulley 5 which is operatively connected to the power consuming machine or apparatus. At this moment the driven pulley starts to be rotated by the driving pulley 4 at a certain reduced rotational speed by way of power transmission assured by magnetic connection between the driving and driven pulleys 4 and 5 with or without the aid of a frictional connection therebetween. Once the driven pulley 5 starts to be rotated, the driving pulley 4 is caused to move to the right as seen in the drawing, that is, toward the high speed side via the intermediate speed area B under the influence of resilent force of the coil spring 3. Thus, the driven pulley 5 is rotated at a gradually increased rotational speed. More particularly, the torque transmission area is displaced from the low speed side A toward the high speed side C via the intermediate speed side B as the driven pulley 5 continues to be rotated steadily. As is apparent from FIG. 1, rotational force of the secondary shaft 6 is transmitted to the power consuming machine or apparatus via a universal joint 13.

Figure 5:
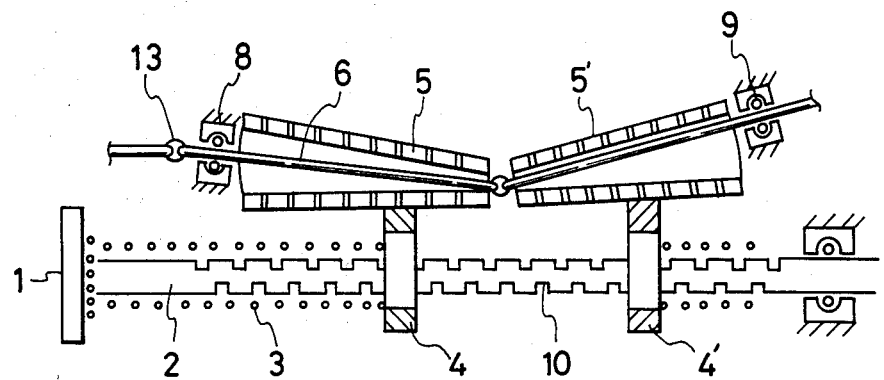
FIG. 5 is a schematic sectional view of a power transmission apparatus in accordance with the second embodiment of the invention.

Next, description will be made as to a magnetically operated or assisted power transmission apparatus in accordance with the second embodiment of the invention as illustrated in FIG. 5.

In this embodiment an opposing pair of combinations of driving pulleys 4, 4' and driven pulleys 5, 5' are arranged in such a manner that the truncated end parts of the driven pulleys 5 and 5' are located in face-to-face relation. Namely, the lefthand combination of driving pulley 4 and driven pulley 5 is located symmetrical to the righthand combination of driving pulley 4' and driven pulley 5' with respect to a central plane extending through a second universal joint of the secondary shaft 6 at a right angle relative to the plane of the drawing. It should be noted that the primary shaft 2 is formed with two spirally extending grooves 10, one of them being intended for the driving pulley 4 and the other one being intended for the driving pulley 4' with such difference therebetween that the direction of extension of the former is opposite to that of the latter. Rotational force of the secondary shaft 6 is transmitted to the power consuming machine or apparatus via a universal joint 13 in the same manner as in the FIG. 1 embodiment.

Operation of the power transmission apparatus in accordance with the second embodiment is quite the same as that of the first embodiment and therefore its repeated description will not be required.

Figure 6:
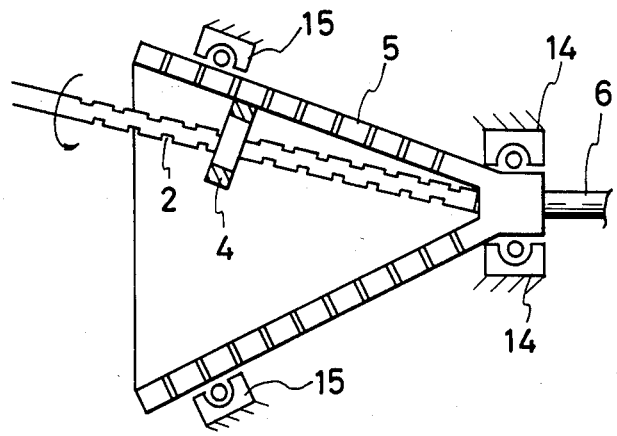
FIG. 6 is a schematic sectional view of a power transmission apparatus in accordance with the third embodiment of the invention.

Next, description will be made as to a magnetically operated or assisted power transmission apparatus in accordance with the third embodiment of the invention as illustrated in FIG. 6.

As is apparent from the drawing, a driving pulley 4 is accommodated in a truncated cone-shaped driven pulley 5 in such a manner that the outer surface of the driving pulley 4 comes in rolling contact with the inner conical surface of the driven pulley 5 which is rotatably supported by means of two ball bearings 14 and 15. The primary shaft 2 is also rotatably supported with the aid of suitable bearing means (not shown) in parallel relation to the inner conical surface of the driven pulley 5.

Operation of the power transmission apparatus in accordance with this embodiment is also similar to that of the above-described embodiments and therefore its description will not be required.

Advantageous features of this invention will be summerized below.

1. Since an operative connection between the driving pulley and the driven pulley is made by magnetic force with or without the aid of frictional force therebetween, rotational force outputted from an engine can be transmitted to a power consuming machine or apparatus reliaably without slippage in the contact area. Thus, high power transmission efficiency is assured.

2. Shifting of the driving pulley on the primary shaft is automatically carried out without necessity for any type of shifting device or mechanism.

3. When the power transmission apparatus is mounted on a vehicle such as a motorcar or the like, engine braking is effectively transmitted to wheels by way of it.

4. It is simple in structure and can be manufactured at an inexpensive cost.

Figure 4:
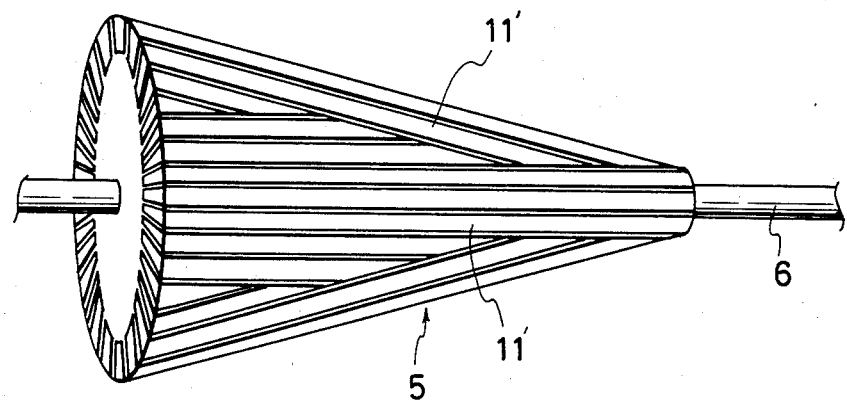
FIG. 4 is a perspective view of a truncated cone-shaped driven pulley which is constructed from a plurality of axially extending magnetizable pieces in the form of plates.

While the present invention has been described above with respect to three preferred embodiments, it should of course be understood that it should not be limited only to them but various changes or modifications may be made isn a suitable manner without departure from the spirit and scope of the invention. For instance, the number of rod-shaped magnetizable pieces 11 on the driven pulley 5 as illustrated in FIG. 1 may be replaced with a plurality of axially extending magnetizable plates 11' with spacers of non-magnetic material interposed between the adjacent ones as illustrated in FIG. 4 without any loss in operational performance. It should be construed that all changes or modifications made in that way are included within the scope of the invention.

What is claimed is:

1. A magnetically operated or assisted power transmission apparatus for steplessly transmitting rotational force outputted from a prime mover to a power consuming machine or apparatus comprising:
 a rotatably-mounted primary shaft operatively connected at a power input end thereof to the prime mover by way of coupling means, said primary shaft having an outer surface in which a spirally extending groove is formed,
 a disc-shaped driving pulley displaceably fitted onto the primary shaft in operational engagement with said spirally extending groove, said driving pulley comprising a plurality of radially extending permanent magnets in spaced adjacent relation to one another with spacers of non-magnetic material interposed between adjacent ones of said magnets,
 an expansive spring means disposed on the primary shaft so as to cause the driving pulley to be normally urged in a direction away from said power input end of the primary shaft,
 a truncated cone-shaped driven pulley whose outer conical surface is adapted to come in rolling contact with the peripheral surface of the driving pulley, said driven pulley being made of non-magnetic material and having a number of rod-shaped magnetizable pieces embedded in the outer conical surface thereof so as to make a magnetic connection between the driving and driven pulleys, and
 a rotatably-mounted secondary shaft made integral with the driven pulley, said secondary shaft extending at a certain inclination angle relative to the primary shaft and being operatively connected at one end thereof to a power consuming machine or apparatus by way of a universal joint.

2. A magnetically operated or assisted power transmission apparatus as defined in claim 1, wherein the truncated cone-shaped driven pulley comprises a plurality of axially extending magnetizable plates with spacers of non-magnetic material interposed between adjacent ones of said plates.

3. A magnetically operated or assisted transmission apparatus for steplessly transmitting rotational force outputted from a prime mover to a power consuming machine or apparatus comprising:
 a rotatably-mounted primary shaft operatively connected at a power input end thereof to the prime mover by way of coupling means, said primary shaft having an outer surface in which two spirally extending grooves are formed, one of the grooves being formed on one half of the primary shaft and the other groove being formed on the other half of the primary shaft, said grooves having respective directions of spiral extension which are opposite to one another,
 two disc-shaped driving pulleys displaceably fitted onto the primary shaft in operational engagement with respective ones of said spirally extending grooves, one of the driving pulleys being disposed on one half of the primary shaft and the other driving pulley being disposed on the other half of the primary shaft, each of said driving pulleys comprising a plurality of radially extending permanent magnets in spaced adjacent relation to one another with spacers of non-magnetic material interposed between adjacent ones of said magnets,
 two expansive spring means, one said spring means being disposed on the one half of the primary shaft so as to cause the one driving pulley to be normally urged in a direction away from said power input end of the primary shaft and the other spring means being disposed on the other half of the primary shaft so as to cause the other driving pulley to be normally urged in a direction toward said power input end of the primary shaft,
 two truncated cone-shaped driven pulleys disposed in such a manner that their truncated end parts face one another and their conical outer surfaces come in rolling contact with respective ones of the peripheral surfaces of the driving pulleys, said driven pulleys being made of non-magnetic material and having a number of rod-shaped magnetizable pieces embedded in the outer conical surfaces thereof so as to make magnetic connections between the driving pulleys and the driven pulleys, and
 two rotatably-mounted secondary shafts made integral with respective ones of the driven pulleys and operatively connected to one another at said truncated end parts of the driven pulleys by way of a first universal joint, said secondary shafts extending at certain respective inclination angles relative to the primary shaft and one of them being operatively connected at the large end of its corresponding driven pulley to a power consuming machine or apparatus by way of a second universal joint.

4. A magnetically operated or assisted power transmission apparatus as defined in claim 3, wherein each of the truncated cone-shaped driven pulleys comprises a plurality of axially extending magnetizable plates with spacers of non-magnetic material interposed between adjacent ones of said plates.

5. A magnetically operated or assisted power transmission apparatus for steplessly transmitting rotational force outputted from a prime mover to a power consuming machine or apparatus comprising:
- a rotatably-mounted primary shaft operatively connected at a power input end thereof to the prime mover by way of coupling means, said primary shaft having an outer surface in which a spirally extending groove is formed,
- a disc-shaped driving pulley displaceably fitted onto the primary shaft in operational engagement with said spirally extending groove, said driving pulley comprising a plurality of radially extending permanent magnets in spaced adjacent relation to one another with spacers of non-magnetic material interposed between adjacent ones of said magnets,
- an expansive spring means disposed on the primary shaft so as to cause the driving pulley to be normally urged in a direction away from said power input end of the primary shaft,
- a rotatably-mounted hollow truncated cone-shaped driven pulley disposed around said primary shaft and driving pulley and having an inner conical surface adapted to come in rolling contact with the peripheral surface of said driving pulley, said driven pulley being made of non-magnetic material and having a number of rod-shaped magnetizable pieces embedded in the inner conical surface thereof so as to make a magnetic connection between the driving pulley and the driven pulley, and
- a secondary shaft made integral with the driven pulley, said secondary shaft extending at a certain inclination angle relative to the primary shaft and being operatively connected to a power consuming machine or apparatus by way of a universal joint.

6. A magnetically operated or assisted power transmission apparatus as defined in claim 5, wherein the truncated cone-shaped driven pulley comprises a plurality of axially extending magnetizable plates with spacers of non-magnetic material interposed between adjacent ones of said plates.

* * * * *